United States Patent [19]
Wallstedt et al.

[11] Patent Number: 5,854,981
[45] Date of Patent: Dec. 29, 1998

[54] ADAPTIVE NEIGHBOR CELL LIST

[75] Inventors: Kenneth Yngve Wallstedt, Solna; Carl Magnus Frodigh, Kista; Håkan Gunnar Olofsson, Stockholm; Knut Magnus Almgren, Sollentuna, all of Sweden; Francois Sawyer, St. Hubert; Andre Beliveau, Laval, both of Canada

[73] Assignee: Telefonaktiebolaget L M Ericsson, Stockholm, Sweden

[21] Appl. No.: 609,422

[22] Filed: Mar. 1, 1996

Related U.S. Application Data

[63] Continuation-in-part of Ser. No. 512,449, Aug. 8, 1995.

[51] Int. Cl.$^6$ ........................................ H04Q 7/20
[52] U.S. Cl. ..................... 455/439; 455/436; 455/422; 455/446
[58] Field of Search ..................... 455/422, 436, 455/439, 446, 500, 517, 524, 525, 62, 67.1, 437, 438, 450

[56] References Cited

U.S. PATENT DOCUMENTS

| | | | |
|---|---|---|---|
| 5,023,900 | 6/1991 | Tayloe et al. | 379/32 |
| 5,095,500 | 3/1992 | Tayloe et al. | 379/32 |
| 5,222,249 | 6/1993 | Carney | 455/33.2 |
| 5,239,682 | 8/1993 | Strawcynski et al. | 455/54.1 |
| 5,260,943 | 11/1993 | Comroe et al. | |
| 5,309,503 | 5/1994 | Bruckert et al. | 379/60 |
| 5,327,575 | 7/1994 | Menich et al. | 455/33.2 |
| 5,422,933 | 6/1995 | Barnett et al. | 379/60 |
| 5,428,816 | 6/1995 | Barnet et al. | 455/436 |
| 5,432,843 | 7/1995 | Bonta | 379/60 |
| 5,475,868 | 12/1995 | Duque-Anton et al. | 455/62 |
| 5,499,386 | 3/1996 | Karlsson . | |
| 5,509,051 | 4/1996 | Barnett et al. . | |

FOREIGN PATENT DOCUMENTS

WO 93/26100   12/1993   WIPO .

*Primary Examiner*—Jacques H. Louis-Jacques
*Assistant Examiner*—Gertrude Arthur
*Attorney, Agent, or Firm*—Jenkens & Gilchrist P.C.

[57] ABSTRACT

A method and apparatus for adaptively reconfiguring a neighbor cell list. For a selected cell of a cellular system, data associated with the selected cell and each of a plurality of neighboring base stations is collected. The collected data includes data on events indicative of the quality of handoffs from the selected cell to each of the neighboring base stations. The collected data also includes signal level measurements made on measurement channels of the neighboring base stations. A plurality of quality values, each associated with the selected cell and one of the neighboring cells, are then determined from the collected data. A neighbor cell list is then generated for the selected cell by determining the highest quality values, and placing the handoff measurement channels of the neighboring cells associated with the highest quality values in the neighbor cell list.

48 Claims, 5 Drawing Sheets

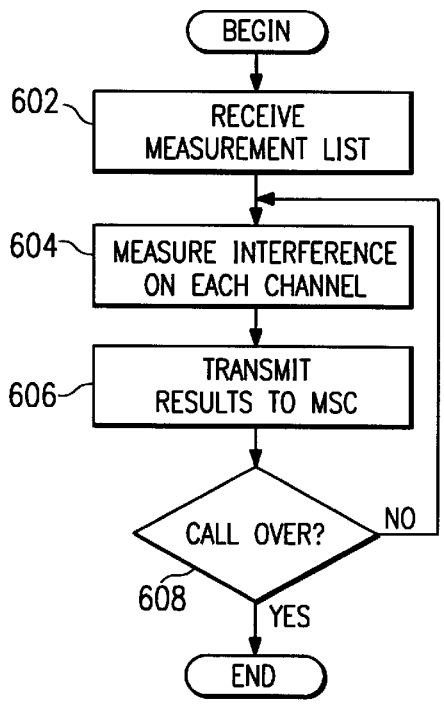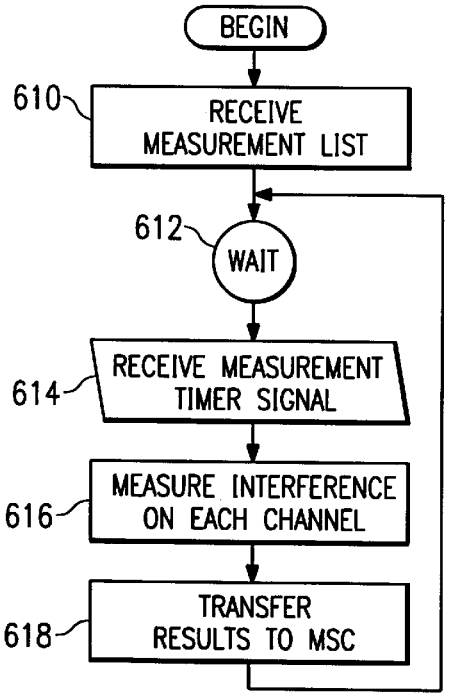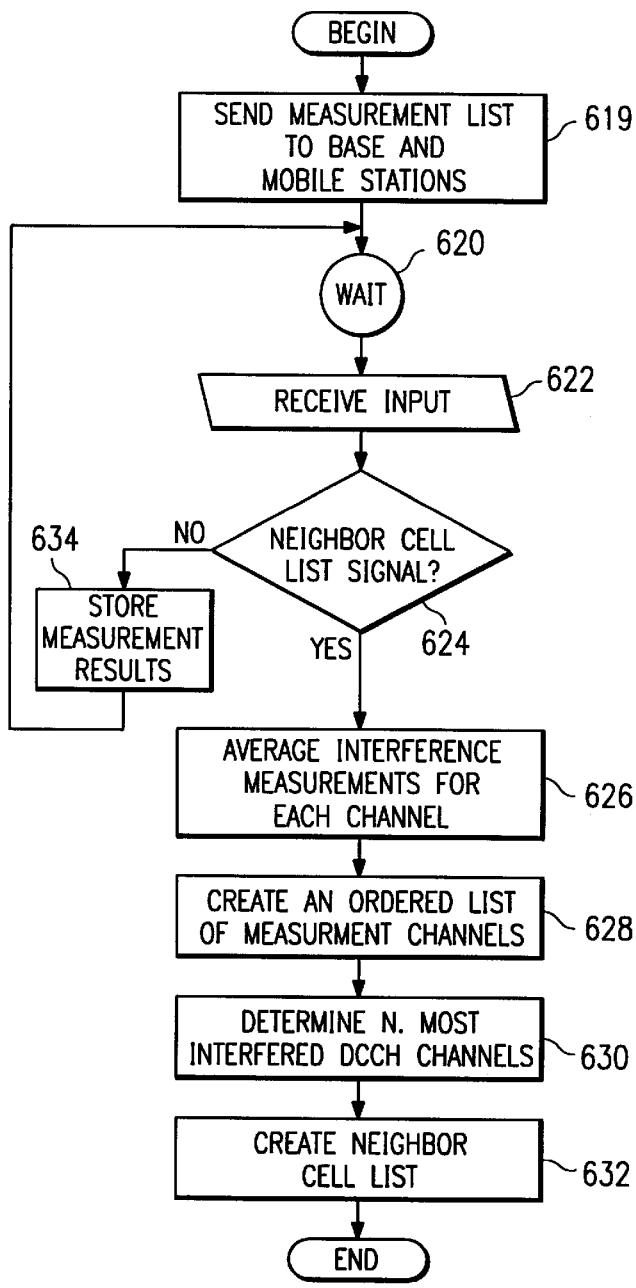

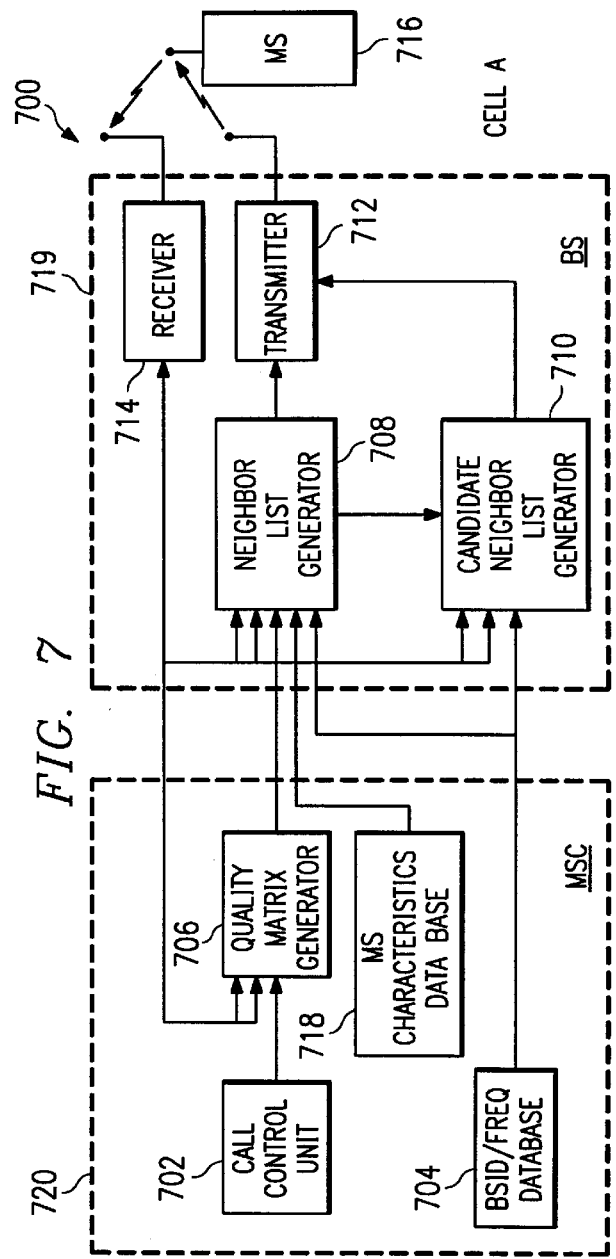
FIG. 6
FIG. 7
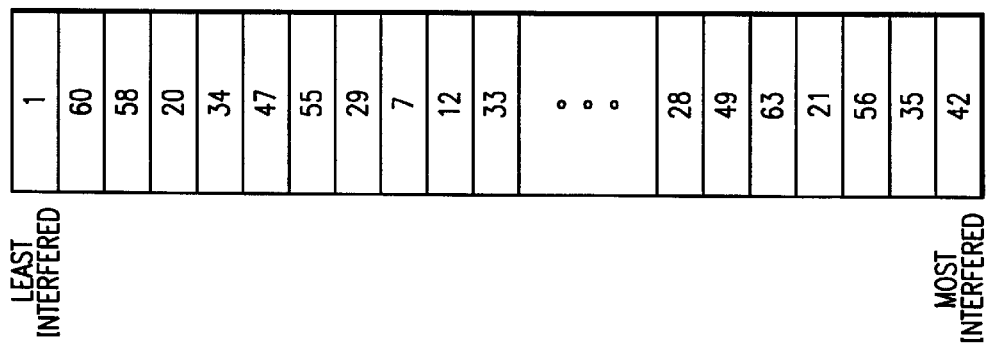
FIG. 5

ADAPTIVE NEIGHBOR CELL LIST

The present application is a continuation-in-part of U.S. patent application Ser. No. 08/512,449 entitled "NEIGHBOR CELL LIST CREATION AND VERIFICATION IN A TELECOMMUNICATIONS SYSTEM", filed on Aug. 8, 1995 now pending.

BACKGROUND OF THE INVENTION

1. Field of the Invention

This invention relates to mobile telecommunications systems, and more particularly, to a method and system for building a neighbor cell measurement channel list for mobile station handoff.

2. History of the Prior Art

In a cellular mobile telecommunications system, the user of a mobile station communicates with the system through a radio interface while moving about the geographic coverage area of the system. The radio interface between the mobile station and system is implemented by providing base stations dispersed throughout the coverage area of the system, each capable of radio communication with the mobile stations operating within the system. In a typical mobile telecommunications system each base station of the system controls communications within a certain geographic coverage area ideally represented by a hexagonal shape termed a cell, and a mobile station which is located within a particular cell communicates with the base station controlling that cell. When a call is initiated by the user of a mobile station, or received at the system for a mobile station, the call is set up on radio channels assigned to the base station controlling the cell in which the mobile station is located. If the mobile station moves away from the original cell in which the call was set up and the signal strength on the radio channels of the original cell weakens, the system will affect transfer of the call to radio channels of a base station controlling a neighboring cell into which the mobile station moves. As the mobile station user continues to move throughout the system, control of the call may be transferred from the neighboring cell to another cell. This transfer of the call from cell to cell is termed handover or handoff.

Handoff can only be effective if the call is transferred to radio channels that provide adequate signal strength for two way communications. This requires sufficient signal strength at both the receiver of the mobile station and receiver of the base station to which handoff is made. The signals must also be sufficiently strong in relation to any noise or interference that is present in the network. For effective handoff it is necessary that some sort of signal strength or interference level measurement process be used to determine which of the neighboring cells is to be selected for handoff. In existing systems the measurement process is done by either making measurements at the receivers of neighboring base stations on signals transmitted from the mobile station, or by making measurements at the receiver of the mobile station on signals transmitted from neighboring base stations. The latter method requires that the mobile station be a part of the measurement process used to select a cell for handoff.

In analog cellular systems operating according to the EIA/TIA—553 Mobile Station—Land Station Compatibility Specification (AMPS) handoff measurements are done solely at neighboring base stations. When signal measurements made at the base station providing coverage in the current cell indicate that the strength of the signal received from a mobile station involved in a call has fallen below a certain threshold, the base station informs the mobile switching center (MSC) in control of the system or system area in which the cell is located. The MSC then initiates the handoff measurement process. The MSC orders base stations of neighboring cells to monitor the signal transmitted by the mobile station on the current radio channel assigned to the call, and measure the strength of the signal. After receiving the measurement results from each base station that received the measurement order, the MSC will then initiate handoff of the call from the current cell to the cell containing the base station reporting the highest received signal strength. The MSC uses a "neighbor cell list" that is associated with the current cell to determine which base stations receive the measurement order from the MSC. The neighbor cell list is created and set manually by the system operator and remains fixed until the operator later manually modifies the list. This type of handoff measurement process requires a large amount of signaling traffic between the MSC and the base stations of the cells contained in the neighbor cell list. This signaling traffic further consumes many processing and signaling link resources. For this reason the number of cells included in the neighbor cell list must be limited. The list if typically configured to include the cells which immediately border the current cell. If hexagonal cell shapes of identical size are used to model of system cells' coverage are there will be six bordering cells.

The nature of the operation of digital cellular communications systems, as opposed to analog cellular systems, allows that the handoff measurement process be performed at the mobile station. An example of these types of systems, are system operating according to the IS-54B EIA/TIA Cellular System Dual-Mode Mobile Station (IS-54B)—Base Station Compatibility Standard. In IS-54B systems the time division multiple access (TDMA) signal transmission mode is used. In TDMA, communications between a base station and a particular mobile station are transmitted on radio channels that also may be used for communications between the same base station and up to two different mobile stations. The communications are carried out through data or digitized voice signals that are transmitted as bursts in timeslots that are time multiplexed on the radio channels. Each mobile station in communication with a base station is assigned a timeslot on both the reverse channel and forward channels. The assigned timeslots are unique to each mobile station so communications between different mobiles do not interfere with each other. The handoff process in IS-54B is known as mobile assisted handoff (MAHO). In MAHO, handoff measurement is done at the mobile station during the times when the mobile station is neither transmitting in the assigned reverse channel timeslot nor receiving in the assigned forward channel timeslot. During the times between signal bursts in an ongoing call, the mobile station periodically monitors radio channels of each base station located in close proximity. The control channel of each neighboring base station is typically used as the measurement channel. For each ongoing call the measurement channels are contained in the neighbor cell list of the cell in which the call is proceeding. In addition to measuring the measurement channels of neighboring base stations, the mobile station also measures the received signal strength on the current channel on which the call is proceeding. The mobile station measures the received signal strength on these radio channels and transmits the measurement results to the current base station. The current base station then forwards these measurement results to the MSC. If the received signal strength on the current channel falls below the received signal strength on a measurement channel of a neighboring cell, the MSC initiates handoff to that neighboring cell.

The analog control channels (ACCH) of the neighboring cells are used as the measurement channels for IS-54B MAHO. With the introduction of the new IS-136 EIA/TIA Cellular System Dual-Mode Mobile Station—Base Station Compatibility Standard (IS-136), which is essentially the IS-54B standard with a digital control channel introduced, it is also possible to use a digital control channel (DCCH) for MAHO measurements.

Because MAHO is performed mostly within the mobile station, the resources for carrying out the process are limited. IS-54B or IS-136 mobile stations can perform only fifty measurements per second. Radio conditions such as Rayleigh fading, shadowing, etc. are such that it is necessary to average measurements in order to provide a reliable signal strength value. Therefore, it is necessary to limit the number of cells that comprise the neighbor cell list for MAHO measurement purposes to much less than fifty cells. The IS-54B standard limits the size of the neighbor cell list to twelve cells. IS-136 sets a size limit of twenty four. The increase in the size of the list in IS-136 over IS-54B has limited effect because the limit of fifty measurements per second still holds and any increase in the number of cells in the list dilutes signal strength measurement precision on any given measurement channel.

When a system operator creates a neighbor cell list for a cell, he attempts to ensure that calls in the cell can be handed over to a second cell, no matter what type of movements takes place. One of the difficulties in creating a neighbor cell list is that the actual coverage area of a cell is difficult to predict. The size and shape of a cell's coverage area may vary due to various effects. Examples of such effects are, base station antennas being located in different positions, or shadowing effects on radio coverage caused by obstacles such as buildings. Although the ideal representation of the coverage area of a cell may be a hexagonal cell having six neighbors of identical shape, the actual coverage areas of cells have differing sizes and shapes. The best candidate cell for handoff may not always be one of the six bordering cells as depicted in the ideal representation when cells within a system are modeled as being of equal size. It is possible that the best candidate for handoff would be a cell located beyond the six bordering cells. In the ideal representation this could be one of the twelve cells adjacent to the ring formed by the six bordering cells. Since it is difficult to predict the actual coverage area of each individual cell in a system, it would be very difficult to create a neighbor cell list for the handoff process in the above situation. Without knowing the actual coverage area of the base stations, it would be necessary to include all eighteen of these cells in the neighbor cell list to create the most accurate list for handoff measurements. In EIA/TIA—553 and IS-54B systems, it is not possible to include all of these eighteen cells in the neighbor cell list. In IS-136 systems, although the standard allows eighteen cells in the neighbor cell list, the number is excessive and the precision of signal strength measurements would not be as great as it could be.

It would provide an advantage then in a cellular system to have a method and system for creating a neighbor cell list that accounts for the differing coverage areas of cells. A method and system of this type would allow creation of a neighbor cell list that would contain the best possible candidate cells for handoff of a call. The method and system would also allow creation of a neighbor cell list of a size that allowed accurate handoff signal strength measurements, while still providing the best possible candidate cells for a list of that size. Automation of the method and system would free the system operator from having to manually create a neighbor cell list for a new cell or, from having to manually reconfigure the neighbor cell list of affected cells when a new cell is added to a system. The present invention provides such a method and system.

SUMMARY OF THE INVENTION

In order to overcome the deficiencies and shortcomings of the prior art, the present invention provides a method and system for creating a neighbor cell list for a cell within a cellular system. The neighbor cell list created according to the teachings of the present invention adaptively accounts for the fact that coverage areas of cells differ from the ideal coverage area that is represented by a hexagonal shaped cell. The neighbor cell list of the invention also accounts for the fact that the cells of a system may be reconfigured, changing the ideal candidates for handoff from a particular cell. Existing methods of neighbor cell creation do not adaptively account for the fact that coverage areas of nearby neighbor cells within the cellular system cannot be accurately predicted or the neighbor cells may be added or removed. The neighbor cell list of the invention may be used during the process of handing off a call from the cell for which the list was created to one of its nearby neighbor cells. By using neighbor cell lists adaptively created according to embodiments of the invention during handoff, a more accurate and efficient handoff than is obtainable with a neighbor cell list created by existing methods can be obtained.

In an embodiment of the invention, a neighbor cell list for each cell of a cellular telecommunications system is adaptively reconfigured as the system operates. For a selected cell of the system, data associated with the selected cell and each of a plurality of neighboring base stations is collected. The collected data may include data on a plurality of events, where the plurality of events includes events that are indicative of the quality of handoffs from the selected cell to each of the neighboring base stations. The collected data may also include signal level measurements made on handoff measurement channels of the neighboring cells within the selected cell. A plurality of quality values, each associated with the selected cell and one of the neighboring cells, are then determined from the collected data.

A neighbor cell list is generated for the selected cell by determining the highest quality values, and placing the handoff measurement channels of the neighboring cells associated with the highest quality values in the neighbor cell list.

In an alternative of the embodiment, when a selected mobile station enters the selected cell, characteristics of the selected mobile station are used together with the quality values to generate a neighbor cell list that is specific to the selected mobile station and selected cell. The mobile station characteristics may include an average speed distribution of the mobile station. For example, in the generation of a neighbor cell list for a fast moving mobile station, the quality values of smaller neighbor cells may be reduced in relation to larger neighbor cells.

In another embodiment of the invention, data is collected within each cell of the system. The collected data may include data on a plurality of events, where the plurality of events includes events that are indicative of the quality of handoffs from each cell to each other cell of the system. The collected data may also include signal level measurements made on handoff measurement channels of cells neighboring each cell of the system. A plurality of quality values are then determined from the collected data. The quality values are each associated with a pair of cells that form a possible handoff path within the system. The relationship of the quality values to possible handoff paths may be represented by placing the quality values in a matrix with a column for each system cell and a row for each system cell. The handoff path for a quality value is then defined as being from the column cell to the row cell of the quality value.

A neighbor cell list is then generated for a selected mobile station operating within the system by performing signal level measurements to determine the relative signal level received from each cell of the system at the selected mobile station and, weighting the quality values by the signal level measurements. The weighting of the quality value may be performed by multiplying the quality value matrix by a signal strength vector formed from the signal level measurement results. Mobile station characteristics may also be used in the generation of the neighbor cell list.

BRIEF DESCRIPTION OF THE DRAWINGS

FIGS. 4A–4C are flow diagrams illustrating steps performed within the mobile station, base station and mobile switching center, respectively, in accordance with a first embodiment of the invention;

FIG. 5 shows a table of channel numbers built according to the teachings of the present invention;

FIG. 6 shows a handoff quality matrix according to a second embodiment of the invention;

FIG. 7 is a block diagram of portions of a cellular system according to a second embodiment of the invention;

DETAILED DESCRIPTION

Figure 1:
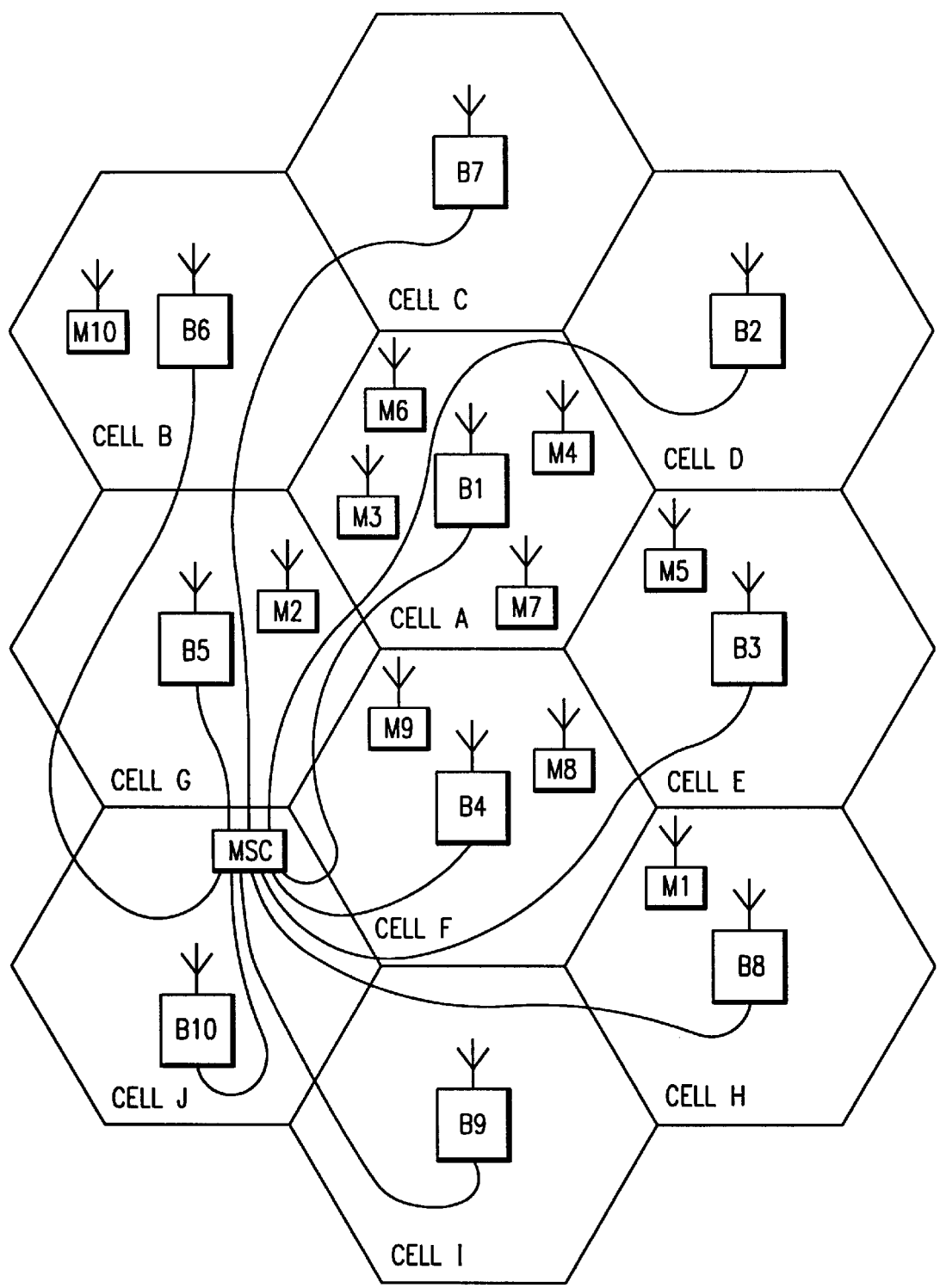
FIG. 1 illustrates ten cells within a cellular telecommunications system of the type to which the present invention generally pertains.

Referring to FIG. 1, there is shown a portion of a conventional cellular radio communication system of the type to which the present invention generally pertains. In FIG. 1, an arbitrary geographic area may be divided into a plurality of contiguous radio coverage areas, or cells Cell A–Cell J. While the system of FIG. 1 is illustratively shown to include only ten cells, it should be clearly understood that in practice, the number of cells will be much larger.

Associated with and located within each of Cell A–Cell J is a base station designated as a corresponding one of a plurality of base stations B1–B10. Each of the base stations B1–B10 includes a transmitter, a receiver, and a base station controller as are well known in the art. In FIG. 1, the base stations B1–B10 are illustratively located at the center of each of Cell A–Cell J, respectively, and are equipped with omni-directional antennas. However, in other configurations of the cellular radio system, the base stations B1–B10 may be located near the periphery, or otherwise away from the center of the Cell A–Cell J and may illuminate Cell A–Cell J with radio signals either omni-directionally or directionally. Therefore, the representation of the cellular radio system of FIG. 1 is for purposes of illustration only and is not intended as a limitation on the possible implementations of the cellular radio system within which the present invention is implemented.

With continuing reference to FIG. 1, a plurality of mobile stations M1–M10 may be found within Cell A–Cell J. Each of the mobile stations M1–M10 includes a transmitter, a receiver, and a mobile station controller as are well known in the art. Again, only ten mobile stations are shown in FIG. 1, but it should be understood that the actual number of mobile stations will be much larger in practice and will invariably greatly exceed the number of base stations. Moreover, while none of the mobile stations M1–M10 may be found in some of Cell A–Cell J, the presence or absence of the mobile stations M1–M10 in any particular one of Cell A–Cell J should be understood to depend in practice on the individual desires of the mobile stations M1–M10 who may roam from one location in the cell to another or from one cell to an adjacent cell or neighboring cell, and even from one cellular radio system served by an MSC to another such system.

Each of the mobile stations M1–M10 is capable of initiating or receiving a telephone call through one or more of the base stations B1–B10 and a mobile station switching center (MSC). A mobile station switching center (MSC) is connected by communication links, e.g., cables, to each of the illustrative base stations B1–B10 and to the fixed public switched telephone network (PSTN), not shown, or a similar fixed network which may include an integrated system digital network (ISDN) facility. The relevant connections between the mobile station switching center (MSC) and the base stations B1–B10, or between the mobile station switching center (MSC) and the PSTN or ISDN, are not completely shown in FIG. 1, but are well known to those of ordinary skill in the art. Similarly, it is also known to include more than one mobile station switching center in a cellular radio system and to connect each additional mobile station switching center to a different group of base stations and to other mobile station switching centers via cable or radio links.

Each MSC may control in a system the administration of communication between each of the base stations B1–B10 and the mobile stations M1–M10 in communication with it. As a mobile station roams about the system, the mobile station registers its location with the system through the base stations that control the area in which the mobile station is located. When the mobile station telecommunications system receives a call addressed to a particular mobile station, a paging message addressed tothat mobile station is broadcast on control channels of the base stations which control the area in which the mobile station is believed to be located. Upon receiving the paging message addressed to it, the mobile station scans system access channels and sends a page response to the base station from which it received the strongest access channel signal. The process is then initiated to create the call connection. The MSC controls the paging of a mobile station believed to be in the geographic area served by its base stations B1–B10 in response to the receipt of a call for that mobile station, the assignment of radio channels to a mobile station by a base station upon receipt of a page response from the mobile station, as well as the handoff communications with a mobile station from one base station to another in response to the mobile station traveling through the system, from cell to cell, while communication is in progress.

Each of Cell A–Cell J is allocated a plurality of voice or speech channels and at least one control channel, such as an analog control channel (ACCH) or digital control channel (DCCH). The control channel is used to control or supervise the operation of mobile stations by means of information transmitted to an received from those units. Such information may include call originations, page signals, page response signals, location registration signals and voice channel assignments.

The present invention involves implementation of a method and system for creating an accurate neighbor cell list to be used for handoff in a cellular system similar to that shown in FIG. 1.

In a first embodiment of the invention, the method and system is implemented into a cellular system like that shown in FIG. 1 that operates according to the IS-136 standard. The IS-136 standard is hereby incorporated by reference. In this first embodiment of the invention, the DCCH channels assigned to each cell of the system for control purposes are also used as the measurement channels for neighbor cell list purposes.

Figure 2:
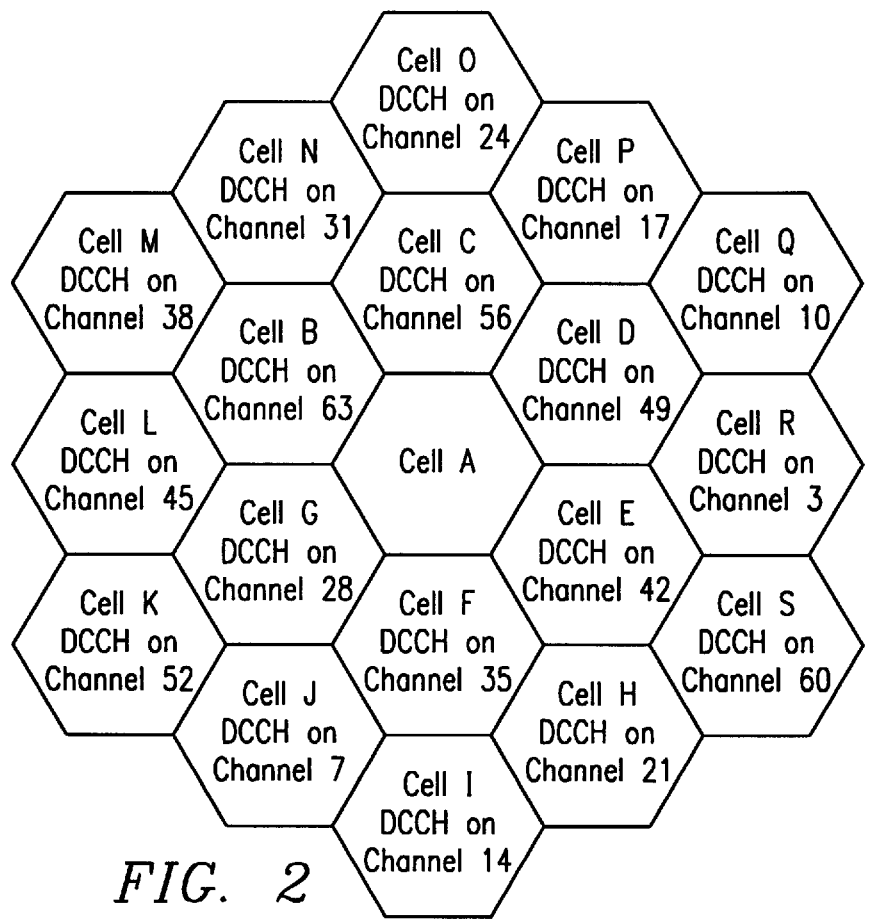
FIG. 2 shows the cells of the system shown in FIG. 1 with additional cells.

Referring now to FIG. 2, therein are shown cells Cell A–Cell J (also shown in FIG. 1) with additional neighboring cells Cell K–Cell S, that also comprise a portion of the same cellular system. Each of Cell K–Cell S may be configured identically to Cell A–Cell J as shown in FIG. 1, with a base station (not shown) located in each cell and Cell K–Cell S being controlled by one or more MSCs (not shown). In FIG. 2, Cell A is located in the center of the collection of Cell B–Cell S. Each of Cell B–Cell S has indicated within it an assigned DCCH channel number. For example, Cell B is assigned DCCH number 42. The DCCH channel number assignments are conventionally fixed for an IS-136 cellular system.

The handoff may be done by the method of mobile assisted handoff (MAHO) specified in commonly assigned U.S. Pat. No. 5,200,957 to Dahlin, which is hereby incorporated by reference. During the procedure for call setup on digital communication channel, the base station informs the mobile station of radio channel frequency and also of a timeslot that identifies the timeslot to be used and digital voice color code (DVCC). During the call setup procedure, the base station also informs the mobile station of a plurality of DCCH channels the signal strength of which are to be measured by the mobile for handoff purposes. This plurality of DCCH channels are the DCCH channels of cells which comprise the neighbor cell list. As a mobile station involved in the ongoing cell moves among Cell A–Cell S of FIG. 2, the system will handoff control of call communications from cell to cell. Depending upon the movement of the mobile station, as well as other circumstances, a new plurality of DCCH channels will be selected and the corresponding neighbor cell list transmitted to the mobile station from the responsible base station during the course of the connection. During the course of the connection, the mobile station measures the signal strength of signals on the given plurality of DCCH channels. Measurements are done during timeslots not used by the digital communication channel.

The mobile station also measures signal strength on the digital communication channel used for the established connection and the bit error rate on the established connection. The mobile station transmits results of its measurements, preferably averaged, frequently to the base station, preferably twice a second.

The base station also measures signal strength on the digital communication channel used for the established connection and the bit error rate on the established connection. The base station processes and analyzes the results of its own measurements and the measurements of the mobile station for comparison with handoff criteria. When, according to the results and criteria, a handoff is desired, the base station informs the mobile switching center indicating at least one target base station assumed suitable for taking over the responsibility for the communication with the mobile.

The mobile switching center requests the target base station(s) to measure signal strength on a radio channel in the timeslot used by the mobile for the established connection. The mobile switching center also informs the target base station on the digital color code used by the he mobile station.

The target base station(s) tune(s) a receiver to the radio channel indicated by the mobile switching center and uses the timeslot identifier of the indicated timeslot for burst synchronization. The target base station checks the appearance of the digital verification color code indicated by the mobile switching center and measures the signal strength of the burst signal provided the digital verification color code is correct. The target base station then transmits the results of the signal strength measurement to the mobile switching center. The target base station also informs the mobile switching center on the result of the checking of the appearance of the digital verification color code, i.e., whether the digital verification color code appeared in the burst in the timeslot of the radio channel.

The mobile switching center determines whether handoff to a target base station should be performed taking the results of the signal strength measurements of target base(s) into account as well as other circumstances, e.g. traffic load.

The first embodiment of the invention herein is used to build a neighbor cell list for use in the above described MAHO process within the IS-136 system. Use of the first embodiment allows creation of a neighbor cell list that accounts for irregular RF effects and radio wave propagation anomalies within the cells of the system.

Figure 3:
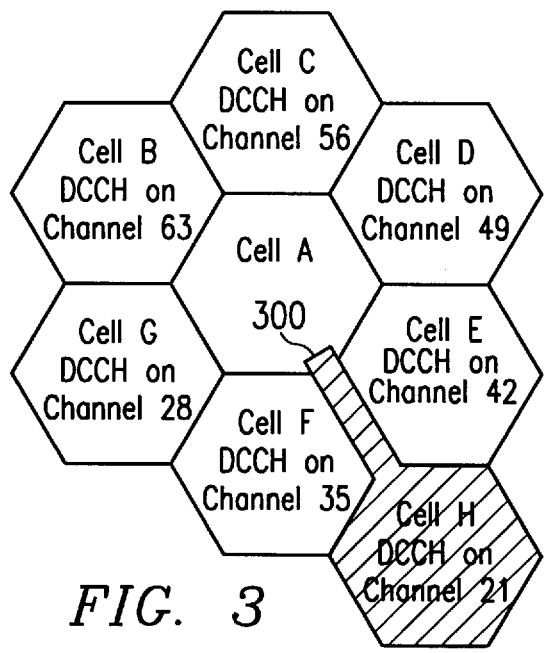
FIG. 3 illustrates a radio propagation island within the cellular system of FIG. 2.

For example, the situation with Cell A–Cell S of FIG. 2 may be such that RF propagation anomalies cause radio propagation islands to form. FIG. 3 illustrates a radio propagation island within the area covered by Cell A, Cell F, Cell E and Cell H of FIG. 2. In FIG. 3 it is shown that, because of geographic effects, or otherwise, the base station controlling Cell H, of all base stations in the system provides the strongest received and transmitted signal strength when communicating with mobile stations located in the shaded area. It would be desirable when a mobile station involved in a call is located at point 300 in FIG. 3 and moving from Cell A into Cell E or Cell F along the shaded area, that control of the call be handed off from the base station of Cell A to the base station of Cell H. This is desirable since Cell H provides the best RF propagation. In this case, the most efficient neighbor cell list for Cell A must include Cell H.

A system operator who manually sets the neighbor cell list for Cell A relying on the model of ideal representation of cell coverage shown in FIG. 1 may, if the neighbor cell list is limited to less than 18 cells in size, not include Cell H in the manually created neighbor cell list. If this manually created neighbor cell list is used to indicate candidate handoff cells for handoff measurement purposes when mobile station M1 moves out of Cell A, call handoff would take place to the base station of either Cell E or Cell F. This may not provide as good a communications connection as is available with the base station of Cell H. Implementation of the invention within the system would solve this problem.

In the first embodiment, a neighbor cell list for Cell A is created by periodically performing signal strength measurements within Cell A on the DCCHs assigned to cells Cell B–Cell H. Uplink measurements are done at base station B1 (shown in FIG. 1) of Cell A and downlink measurements are performed by mobile stations located within Cell A and under the control of base station B1 at the time of measurement. For example, in the situation shown in FIG. 1 mobile stations M3, M4, M6 and M7 would perform the downlink signal measurements during a call. The signal strength measurements made at the mobile are transmitted to the system via the base station. The signal strength measurements are performed periodically over a period of time. The results of the signal strength measurements can be used to obtain an average signal strength for each of the DCCHs in Cell B–Cell S. As an alternative, the signal strength measurements can be used to determine the frequency or number of times a signal strength measurement above a certain threshold level was obtained on each of the DCCHs of Cell B–Cell S. The processing of the signal strength measurements is done by the base station controller, or alternatively, the measurement results can be sent to the MSC for processing. It will be obvious to a practitioner skilled in the art that signal strength measurements may be performed by numerous methods.

The first embodiment of the invention is implemented into an IS-136 system using Adaptive Channel Allocation (ACA) and the neighbor cell list is created by utilizing functions of the ACA feature.

In Adaptive Channel Allocation various measurements of signal quality and interference levels of dynamically allocated communications channels are performed to build a list of traffic or voice channels that may be assigned to a call made from within a cell. The interference levels are measured by measuring the signal strengths on channels allocated to neighboring cells. Typically, ACA is implemented in systems in which any cell may be assigned any dynamically allocated traffic or voice channel of the system. The base station controlling a cell and mobile stations within the cell's coverage area perform measurements on a set of channels that the system operator has assigned to be dynamically allocated for communications within the system. The system then builds, for each cell, a table of channels from the least interfered (highest quality) to the most interfered (lowest quality). The system then selects a certain number of least interfered channels from that list to allocate to communication in that cell. Other criteria, such as certain required frequency separation between the channels chosen and avoiding certain combinations of channels whose frequencies create intermodulation interference, are also considered in the selection of channels. Various methods at Adaptive Channel Allocation are well known to those having ordinary skill in the art. These known Adaptive Channel Allocation methods utilize various criteria for selecting channels for allocation.

For example, H. Eriksson, "Capacity Improvement by Adaptive Channel Allocation", *IEEE Global Telecomm. Conf.*, pp. 1355–1359, Nov. 28–Dec. 1, 1988, illustrates the capacity gains associated with a cellular radio system where all of the channels are a common resource shared by all base stations. In the above-referenced report, the mobile measures the signal quality of the downlink, and channels are assigned on the basis of selecting the channel with the highest carrier to interference ratio (C/I level).

It is preferable to implement ACA schemes in two parts: a "slow" part, and a "fast" part. The "slow" part determines, for each cell, a set of channels to be used based on interference and traffic fluctuations that occur over a relatively long period of time (e.g., 20–30 busy hours, which could take several weeks to occur). This eliminates the frequency planning problem, and may also adapt to average traffic loads in the system. The "fast" part is concerned with selecting at any given moment, from the slowly determined set of channels, the "best" channel for each connection, based on short term interference measurements. Implementation of both the "slow" and the "fast" parts of an ACA scheme may be distributed in the system, so that each base station determines its portion of the frequency plan as well as channel assignments based on local observations within the cell.

One reason for splitting an ACA scheme into two parts (i.e., "fast" and "slow") is because of the use of auto-tuned combiners that are mechanically tuned, by means of small motors, to desired frequency ranges. Tuning is an automatic, but slow, operation that cannot be performed when a call arrives at the cell.

In the first embodiment, the neighbor cell list creation process for a particular cell in the IS-136 system is implemented by including the DCCH channels of neighboring cells in the list of channels to be measured for ACA within that cell. The ACA process used in this first embodiment utilizes the measurement process of the MAHO process described above to perform channel measurements at the mobile station. The ACA measurements at the mobile station are performed by placing a different channel from the ACA list in the list of channels included with the MAHO measurement order transmitted at each call setup.

Base station ACA measurements are made at the base station of each cell of the system using the same ACA list. In the invention the DCCH channels of neighboring cells are also added to the base station ACA list. The base station then performs periodic measurements on the channels in the ACA list.

To create a neighbor cell list for a particular cell, the process of the first embodiment adds the extra channel or channels from the ACA list to the channels of cells contained in an initial neighbor cell list used for MAHO measurements. The initial neighbor cell list for a cell consists of the immediate neighbors of that cell as determined by the ideal hexagonal representation of cell shape. For example, the initial neighbor cell list for Cell A of FIG. 2 would consist of Cell B–Cell G. At each call setup within a cell for which a neighbor cell list is to be created, the extra ACA channel is included in the MAHO measurement order Continuing using Cell A as an example, as a call setup is made in Cell A, a mobile station will receive a MAHO measurement list including the DCCH channels of Cell B–Cell G, and an additional channel taken from the ACA list. The additional channel could include one of the channels to be dynamically allocated within the system or, a DCCH channel of Cell H–Cell S. Each time a new call setup occurs, a different channel from the ACA list is used. The ACA measurements including the DCCH channels are collected by the system over a relatively long period of time, preferably 20–30 busy hours, which could take several weeks to occur. An ordered interference level table is then created within the base station controller or MSC from these ACA measurements.

From the standpoint of Cell A, the DCCH channel frequencies of Cell B–Cell G (and certain other cells of Cell H–Cell S) will exhibit a lot of interference (strong signal strength) compared to other DCCH channel frequencies of the system since these cells are located close to Cell A. Base station B1 will measure an amount of interference on the DCCH uplink frequencies of Cell B–Cell G comparatively larger than the amount of interference measured on the DCCH channels of other cells since there are mobile stations continuously registering and making call accesses on these channels. B1 will also measure much interference on the DCCH uplink frequency of Cell H since the coverage area of Cell H overlaps the coverage areas of Cell E and Cell F. The mobile stations located within Cell A which collectively measure on all DCCH downlink frequencies will measure an amount of interference on the DCCHs of Cell B–Cell G, and Cell H, larger than that measured on the DCCH channels of other cells since the neighboring base stations are continuously transmitting on these frequencies.

Referring now to FIG. 4A, therein is shown a flow diagram illustrating measurement steps performed by each mobile station during each call within a particular cell according to the first embodiment of the invention. At Step 602 the mobile station receives the MAHO list from the MSC via the base station. The MAHO list includes the extra channel for ACA measurements during call setup. The ACA measurement process is modified to include the DCCH channel numbers of neighboring cells so that a neighbor cell list can be created according to the invention. Next, at Step 604 the mobile station measures the interference level (signal strength) on the downlink of each channel in the measurement list during the MAHO measurement process. Next, at Step 606 the mobile station transmits the measurement results to the MSC via the base station controlling the cell. The process then moves to Step 608 where it is determined if the call is over. If the call is over, the process ends. If, however, the call is ongoing, the process returns to Step 604 and, after an appropriate delay, repeats the interference level measurements. The process of FIG. 4A is repeated for every call setup within a cell of the system.

Referring now to FIG. 4B, therein are shown the steps performed within the base station according to the first embodiment of the invention. The process beings at Step 610 as the base station receives the ACA measurement list from the MSC. The ACA measurement list for the base station contains all the ACA channels as well as the DCCH channels of neighboring cells. Next, the process moves to Step 612 as the base station waits for a measurement timer signal. The measurement timer signal is generated by the base station controller depending upon the desired ACA measurement period. Upon receiving a measurement timer signal at Step 614, the process moves to Step 616 where the base station measures uplink interference (signal strength) on each measurement channel in the measurement list. Next, at Step 618, the base station transfers the results to the MSC. From Step 618 the process then returns to Step 612. This process is repeated periodically according to the measurement timer signal.

Referring now to FIG. 4C, therein are shown the steps performed within the MSC according to the first embodiment of the invention. At Step 619 the measurement process begins as the MSC sends the base station and mobile station measurement lists to the base station. The mobile station measurement list will then be further transmitted to the mobile station from the base station. From Step 619 the process then moves to the wait state of Step 620. At Step 622 the MSC receives an input. The input is either a set of measurement results from a mobile station or base station or, a neighbor cell list signal. The measurement results will be received over a period of time, whenever the mobile station transmits results to the system or the base station transfers measurement results to the MSC. The neighbor cell list signal is received from a system timer and indicates that it is time to average the interference measurements. Next, at Step 622, it is determined what type of input was received. If measurement results were received, the process moves to Step 634 where the results are stored. From Step 634 the process returns to Step 620. If, however, a neighbor cell list signal was received, the process moves to Step 626 where the stored measurement results are averaged to create an average interference level for each measurement channel. Next, at Step 628, the MSC controller creates an ordered list of all measurement channels for which measurement results were received.

Referring now to FIG. 5, there is shown an example of a table of Channel Numbers built from measurements performed by modifying Adaptive Channel Allocation for Cell A according to the first embodiment of the invention. The table in FIG. 5 shows Channel Numbers used within Cell A–Cell S of FIG. 2 ranked from least interfered (lowest received average signal strength) to most interfered (highest received average signal strength), as measured at the base station B1 and at mobile stations located within Cell A during ACA measurement times. In FIG. 5, the DCCH channels of Cell B–Cell G and of Cell H are located at or near the bottom of the table. The DCCH channels of these cells are therefore among the most interfered channels as measured within the coverage area of Cell A.

From Step 626 the process moves to Step 628, where the MSC controller determines the N most interfered DCCH channels in the ordered measurement list.

In order to create the neighbor cell list for any cell, a number (N) of the most interfered DCCH channels are determined from the table of FIG. 5. The N most interfered DCCH channels are the N channels having the N highest received signal strengths.

Next, at Step 632, a neighbor cell list is created. Continuing with the example, if not already contained in the list, are added to the initial neighbor cell list containing the DCCH channels of Cell B–Cell G. If the DCCH channels of any of cells Cell B–Cell G are not in the group of N cells, they may be removed from the initial list. This same result may be accomplished by simply replacing the initial neighbor cell list with the N most interfered DCCH channels.

As an alternative, the neighbor cell list for Cell A may be created by taking the DCCH channels from the table of FIG. 5 that have an interference level above a certain threshold, rather than taking a set number of N channels. The threshold may be set to create a neighbor cell list within a desired size limit.

For the system of FIGS. 1–4, if the ACA measurements are collected over a statistically valid time period, Cell H will be among the cells added to the initial neighbor cell list. As an alternative, a certain number of the cells Cell B–Cell S having the most interfered DCCH channels could be placed in the neighbor cell list for Cell A, without using interference threshold criteria.

If a mobile station happens to be located at location 300 in FIG. 3 and moving into the coverage area of Cell H, the MAHO process will result in a call handoff to Cell H as long as the neighbor cell list created is of a size $N \geq 7$.

By implementing the present method and system within a cellular system, it would not be necessary to include all of the eighteen cells in FIG. 2, Cell B–Cell S, that are closely proximated to Cell A in the neighbor cell list to overcome problems caused by RF propagation effects such as that illustrated in FIG. 3. The size of the neighbor cell list could be set to a value of N less than eighteen by using an appropriate interference threshold when choosing DCCH channels for the list, or by placing a set number of most interfered DCCH channels in the list. If the system operator desired to have high signal strength measurement precision for handoff, the threshold could be set high or the set number of DCCH channels chosen could be minimized to account for only the strongest RF propagations effects such as that shown in FIG. 3. The nearer the value of N to eighteen, the greater the number of RF propagation effects accounted for.

Once a neighbor cell list has been created, the method and system of the first embodiment may be used to periodically verify the neighbor cell list. The verification is done by continuing to make measurements with the ACA measurement list modified as before, but also now including the DCCH channels of all neighbor cells.

Again, using Cell A as an example, a neighbor cell list created by the method and system of the present invention is verified by continuing to use the DCCH channels of Cell B–Cell S in the ACA measurement list. Measurements on DCCH channels contained in the ACA have ben made over a relatively long period of time as before (20–30 busy hours, or several weeks). The existing neighbor cell list is compared with the list of cells having a DCCH channel interference level above a certain threshold. If a cell in the existing neighbor cell list is not contained in the list of cells having an interference level above the certain threshold, that cell is removed from the neighbor cell list. If a cell having an interference level above the certain threshold is not contained in the existing neighbor cell list, that cell is added to the neighbor cell list. In the alternative, the N most interfered DCCH channels, where N equals the number of DCCH channels in the neighbor cell list, could be compared to the neighbor cell list.

The method and system is also useful when a system operator installs a new cell site within a cellular system. In this case relatively short term measurements according to the invention could be used to initially set a neighbor cell list for the new cell. The neighbor cell list of cells surrounding the new cell could also be set by short term measurements. Use of short term measurements would allow the system operator to get the cell installed and operating quickly. Longer term measurements could then be performed as described above to verify the neighbor cell list created for the new cell and cells that surround it.

The number of DCCH channels on which signal strength is measured may be much larger than the actual neighbor cell list. The only limitation on this DCCH channel list is that it is preferable that no two cells on the list have the same measurement channel number. It will be obvious to those skilled in the art that there are clear advantages to ensuring that the measurement channel number frequencies are not repeated, if only for the purposes of MAHO.

The neighbor cell list for a cell may also be created and verified using data other than signal level measurements made at the cell base station and mobile stations operating within the cell. Signal level measurements as performed according to the first embodiment of the invention may also be included as data in this second embodiment. In the second embodiment of the invention, various data parameters may be used to create a neighbor relation matrix (Q matrix) that defines the relative desirability of the cells of the system as handoff candidates in each of the other cells' neighbor lists.

Referring now to FIG. 6, therein is shown the neighbor relation matrix (Q matrix) according to a second embodiment of the invention. The Q matrix of FIG. 6 is formed for the system shown in FIG. 2. Because the system of FIG. 2 has 19 cells, the Q matrix is formed of 19 rows and 19 columns. Generally, for any cellular system having n cells, the Q matrix includes n rows and n columns. Each row and column is associated with one of the cells in the system. For each intersection of a row and column a quality value ($q_{xy}$), where $q_{xy}$ indicates a quality value for handoff from $Cell_x$ to $Cell_y$, is assigned to the Q matrix. The quality value is an indicator of the relative desirability of the row cell for use in the neighbor cell list of the column cell. For example, in FIG. 6, the quality value $q_{GA}$ indicates the relative desirability of use of Cell A in the neighbor cell list of Cell G when compared to the other cells of the system. The Q matrix column for a selected cell defines the relative desirability of each of the other cells of the system for use in the selected cell's neighbor cell list. A q value of the Q matrix is based on information specific to the row and column cells corresponding to the q value location in the matrix. Each q value may be calculated as a value based on measurement data and, event data collected within the cell associated with the column of the quality value. For example, for each pair of cells, $q_{GA}$ may be calculated as a function of measurements performed within Cell G by the process of FIGS. 4A and 4B, and as a function based on data comprising statistics related to handovers from Cell G to Cell A. Alternatively, the q values may be based only on statistics relating to events. The statistics used may include calls lost during handovers from Cell G to Cell A, unsuccessful handover attempts from Cell G to Cell A, or unsuccessful mobile station presence verifications during attempted handoffs from Cell G to Cell A.

It is not necessary to include q values in the matrix positions where columns and rows of the same cells intersect for the second embodiment of the invention since a quality value for handoff from one cell to the same cell has no meaning. However, in an alternative, at the second embodiment of the invention it is necessary to insert a predetermined value in this position.

The neighbor cell list for a cell may be created by determining a predetermined number of the highest quality values in that cell's Q matrix column, and then choosing the cells associated with the rows in which the highest quality values are located. For example, a neighbor cell list, of size N, for Cell G may be created by choosing the N row cells having the highest q values in the Cell G column. The DCCH channels of the chosen N row cells are then placed in the neighbor cell list of Cell G. Characteristics of the mobile station or a particular subscriber using the mobile station may also be used in choosing the row cells to be placed in the neighbor cell list. For example, the distribution of the average speed of a mobile station within the system may be used to disqualify smaller cells, since the mobile station would move quickly through the smaller cells, requiring another handoff sooner than if the mobile was handed off to a larger cell.

Referring now to FIG. 7, therein is shown a functional block diagram of a portion 700 of a cellular system operating according to a second embodiment of the invention. The second embodiment of the invention comprises functions that may be implemented in MSC 720 and base station (BS) 719 of the system of FIG. 2. Base station 719 controls Cell A. Base stations (not shown) identical to base station 719 are also implemented in each other cell of the system. MSC 720 comprises call control unit 702, base station identity/frequency (BSID/Freq) database 704, mobile station (MS) characteristic database 718 and quality matrix generator 706. MSC 720 comprises functions that perform Q matrix generation at the system level, i.e., MSC 720 generates one Q matrix that is used by all base stations of the system in creating neighbor cell lists. Quality matrix generator 706 generates the Q matrix from data received from call control unit 702 and measurement data from receiver 714.

Base station 719 comprises neighbor list generator 708, candidate neighbor list generator 710, transmitter 712 and receiver 714. The neighbor list generator 708 and candidate neighbor list generator 710 interface with mobile station (MS) 716, which is located within the coverage area of base station 719 (Cell A), over the system air interface through transmitter 712 and receiver 714. Base station 719 comprises functions that are used to create neighbor cell list for Cell A from the system Q matrix. Each of Cell B–Cell S includes a base station with identical functions.

Figure 8:
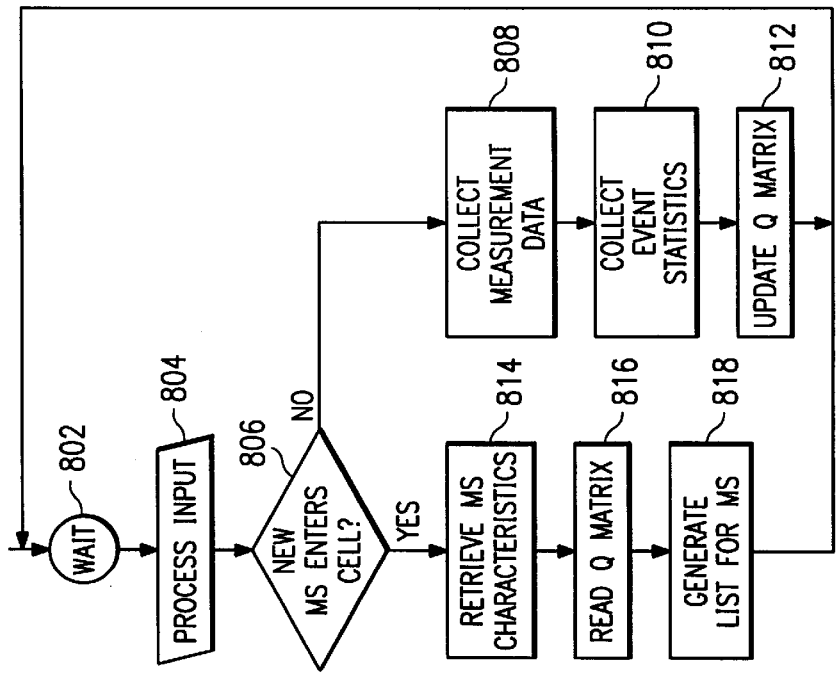
FIG. 8 is a flow diagram illustrating process steps performed according to a second embodiment of the invention.

Referring now to FIG. 8, therein is shown a flow diagram illustrating process steps performed within a system according to the second embodiment of the invention. The process of FIG. 8, uses mobile station characteristics when generating a neighbor cell list for a selected mobile station within a selected cell. Each neighbor cell list created by the process of FIG. 8 is therefore mobile station specific as well as cell specific. It would also be possible to omit the use of mobile station characteristics from the process to create a neighbor cell list that was cell specific. The process of FIG. 8 will be described with reference to an example of mobile station 716 newly registering with base station 718.

The process initially is in the wait state of Step 802. At Step 804, a process input is received. The process input is either a signal indicating that a mobile station is newly registering within a cell or, that it is time to update the system's Q matrix with stored data. The stored data used to update the Q matrix comprises measurements made at all mobile stations within Cells A–S of the system and event statistics from Cells A–S stored within call control unit 702. From Step 804, the process moves to Step 806 where a determination is made as to whether the process input indicates that a mobile station is newly registering in the cell. If it is determined that a mobile station is newly registering within the cell, the process moves to Step 814. Taking the example of mobile station 716 newly registering within Cell A, the process will move to Step 814. At Step 814, neighbor cell list generator 708 base station 719 retrieves mobile station characteristics of the newly registering mobile station 716 from MS characteristic database 718. Next, at Step 816, neighbor list generator 708 reads the Cell A column quality values of the system level Q matrix from quality matrix generator 706. Next, at Step 818, neighbor cell list generator 708 determines a neighbor list of size N using the Q matrix and the mobile station characteristics, by choosing the N neighbor cells in the system Q matrix having the highest q values in the column for Cell A taking the mobile station characteristics into account. At Step 818, candidate neighbor list generator 718 also generates a list of Y candidate neighbor cells that are not contained in the neighbor list generated by neighbor list generator 708. The list of Y candidate neighbor cells is used to obtain signal level measurements on cells not chosen as the N neighbor cells by neighbor list generator 708. These signal level measurements on candidate neighbor cells are necessary to form a complete Q matrix. For each newly registering mobile station in Cell A, a different candidate cell list may be generated by candidate neighbor list generator 710 so that all signal level measurements necessary to form the Q matrix column for Cell A are obtained over time. The values of the numbers N and Y may be set as desired by the system operator. The neighbor list generator and candidate neighbor list will be transferred to transmitter 712, where the candidate neighbor list is added to the neighbor list and transmitted to mobile station 716 at call setups. The process then returns to the wait state of Step 802. The process of Steps 804 through 818 is also followed within each of Cells B–S each time a mobile station registers in one of those cells to create Q matrix columns for each of those cells.

While the process is in the wait state of Step 802, as mobile station 716 is involved in calls within Cell A and the MAHO process is performed, measurements will be made on channels identified in the combined neighbor and candidate neighbor list at mobile station 716. Measurements on the same channels may also be made at receiver 714. The measurement results are then transferred to quality matrix generator 706 and neighbor list generator 708. Measurements will also be made and transferred to quality matrix generator 706 for all other mobile stations that register in Cells B–S that are involved in a call. At the same time, the system is collecting and storing event statistics in call control unit 702. The event statistics are associated with all of Cells A–S.

Cyclically, at predetermined times, a process input is received at Step 804 indicating to quality matrix generator 706 that it is time to generate a new system Q matrix. Next, at Step 806, it will be determined that the process input did not indicate that a mobile station is newly registering in cell of the system. The process therefore will move to Step 808, where the current signal level measurements from all Cells A–S are collected by the quality matrix generator 706. Next, at Step 810, the quality matrix generator 706 collects current event statistics on all Cells A–S from call control unit 702. Next, at Step 812, quality matrix generator 706 updates the Q matrix using the current event statistics and current signal level measurements. This updated Q matrix will then be used by the neighbor list generator of each base station in generation of a neighbor list for each newly registering mobile station in the cell of the base station, as was described for in Steps 804, 806, 814, 816 and 818.

As an alternative to the second embodiment of the invention, the complete system Q matrix may be weighted by signal measurements made at a selected mobile station to create a quality value vector specific to selected mobile station. For example, when mobile station 716 of FIG. 7 is located within Cell A of FIGS. 1 and 2, the results of signal strength measurements made at mobile station 716 on each of the DCCH channels of the surrounding cells may be used to create a signal strength column vector SW having a vector $S_x$ for each of the signal strengths received from Cell X as received at mobile station 716. The column vector SW should include a value $S_x$, where x is the cell in which the mobile station is presently located.

$$SW = \begin{pmatrix} SW_a \\ SW_b \\ \vdots \\ \vdots \\ \vdots \\ SW_s \end{pmatrix}$$

The Q matrix may then be multiplied by SW to calculate a weighted QW vector for the cell and mobile station:

$$QW \text{ vector} = \begin{pmatrix} q_{AA} & q_{BA} & \cdots & q_{SA} \\ q_{AB} & q_{BB} & \cdots & q_{SB} \\ . & . & \cdots & . \\ . & . & \cdots & . \\ . & . & \cdots & . \\ q_{AS} & q_{BS} & & q_{SS} \end{pmatrix} \cdot \begin{pmatrix} S_A \\ S_B \\ \cdots \\ \cdots \\ \cdots \\ S_S \end{pmatrix} = \begin{pmatrix} qw_A \\ qw_B \\ \cdots \\ \cdots \\ \cdots \\ qw_S \end{pmatrix}$$

The QW values may then be used to select the N most preferable neighbor cells for the neighbor list, i.e., those N cells having the highest QW values. In the Q matrix used in this alternative, the quality values $q_{AA}$, $q_{BB}$, ..., $q_{SS}$, where the row and column cells are identical, may be set to a predetermined value to allow vector multiplication.

Figure 9:
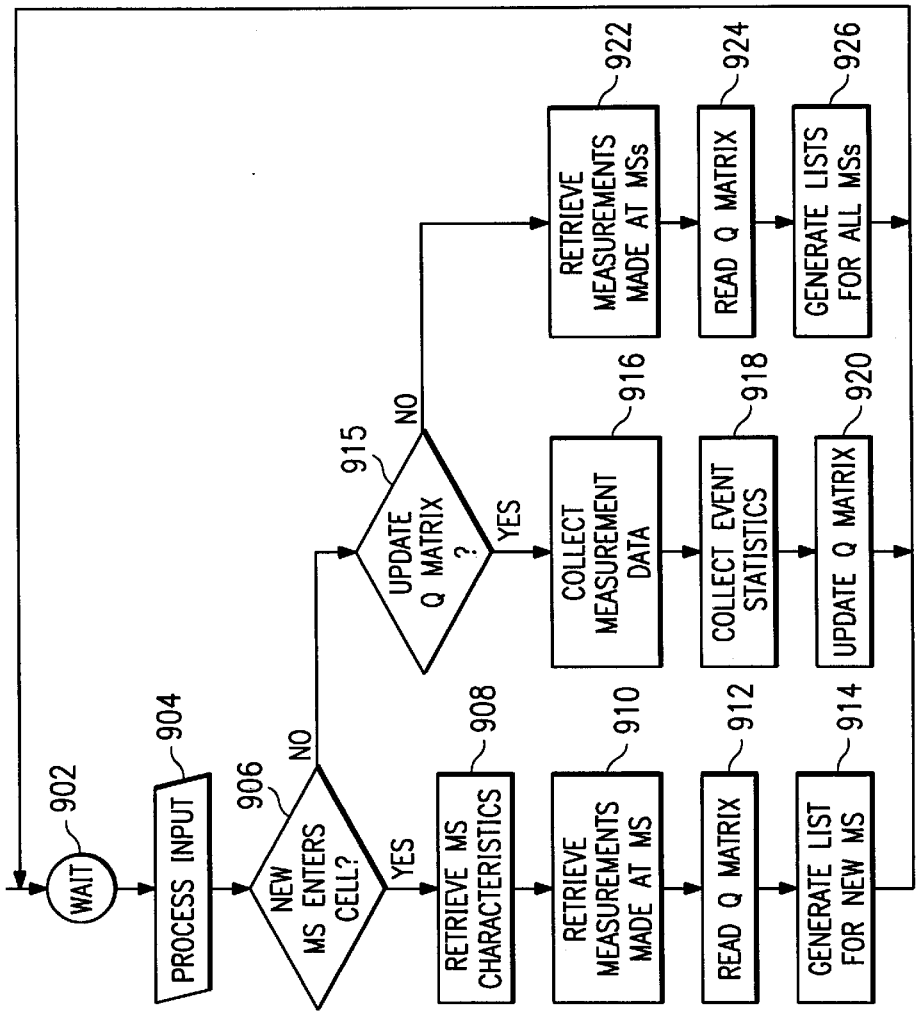
FIG. 9 is a flow diagram illustrating process steps performed according to an alternative of a second embodiment of the invention.

Referring now to FIG. 9, therein are process steps performed according to the alternative of the second embodiment of the invention. FIG. 9 will be described with reference to an example of mobile station 716 newly registering in Cell A.

The process is initially in the wait state at Step 902. At Step 904, a process input is received. The process input is either a signal indicating that a mobile station is newly registering within a cell, that it is time to update the system's Q matrix with stored data or, that it is time to update measurement lists for each mobile station within the cells of the system. The stored data used to update the Q matrix comprises signal level measurements made at all mobile stations within Cells A–S of the system and event statistics stored within call control unit 702. The measurement lists for each mobile station within the system are generated from the system Q matrix and measurements made at the particular mobile station for which the list is being generated.

After receiving the process input at Step 904, the process moves to Step 906 where a determination is made as to whether the process input indicates that a mobile station is newly registering within the cell. If it is determined that a mobile station is newly registering within a cell, the process moves to Step 908. In this example, mobile station 716 is newly entering Cell A so the process moves to Step 908. At Step 908 neighbor cell list generator 708 of BS 719 retrieves the mobile station characteristics of mobile station 716 from MS characteristic database 718 of MSC 720. Next, at Step 910, neighbor list generator 708 retrieves the latest set of signal level measurements, SW, that have been made at mobile station 716. The latest set of signal measurements may be obtained from measurements made within the cell where mobile station 716 was previously located and stored within quality matrix generator 706. Next, at Step 912, neighbor cell list generator reads the Q matrix from quality matrix generator 706. Next, at Step 914, neighbor list generator 708 generates a measurements list for mobile station 716 for use within Cell A. Step 914 is performed for mobile station 716 within Cell A. Neighbor list generator 708 generates the list by multiplying the Q matrix by the signal strength vector SW for mobile station 716 and then selecting a number of QW values having the strongest $QW_{AX}$ values, where x=B, C, D , . . . S. The DCCH channels of the N cells associated with the N strongest QW values for mobile station 716 are then placed in the neighbor list. Characteristics of mobile station 716 may be taken into account when creating the neighbor list for mobile station 716. During Step 914 candidate neighbor list generator 710 also forms a candidate neighbor list in the manner as was described in Step 818 of FIG. 8. The neighbor list and candidate neighbor lists for mobile station 716 are then transferred to transmitter 712 for transmission to mobile station 716. The process then returns to the wait state of Step 902. While the process is in the wait state of Step 902, quality matrix generator 706 receives signal level measurements and event data from all mobiles involved in calls in all cells of the system. Also, the neighbor cell list generator 708 receives signal level measurements from mobile stations within Cell A.

Cyclically, at predetermined times, a process input is received at Step 904 indicating that it is time to generate a new Q matrix. Next, at Step 906, it will be determined that the process input did not indicate that a mobile station is newly registering in a cell of the system. Next, at Step 915, it will be determined that it is time to update the Q matrix. The process therefore will move to Step 916, where the current signal level measurements made in all cells on the DCCHs of neighbor cells, including candidate neighbor cells, are collected by the quality matrix generator 706. Next, at Step 918, the quality matrix generator 706 collects the current event statistics on all cells from call control unit 702. Next, at Step 920, quality matrix generator 706 updates the Q matrix using the current event statistics and current signal level measurements. The process then returns to the wait state of Step 902.

The updated Q matrix created in Steps 916 through 920 is used by the neighbor list generator of each system base station to generate a measurement list for each mobile station within that cell at predetermined time periods.

Cyclically, at predetermined times, a process input is received at Step 904 indicating to quality matrix generator 706 that it is time to generate a new measurement list for each mobile station within the system. Next, at Step 906, it is determined that the process input did not indicate that a mobile station is newly registering in a cell of the system. Next, at Step 915, it is determined that it is not time to update the Q matrix. The process therefore will move to Step 922. The process of generating a measurement list for each mobile station within a cell will be described with reference to FIG. 7 and Cell A. At Step 922, neighbor list generator 708 retrieves the latest sets of signal level measurements, SW, that have been made at each mobile station within Cell A. Next, at Step 924, each neighbor list generator 708 reads the Q matrix from quality matrix generator 706. Next, at Step 926, the neighbor list generator 708 generates, as was described previously for Step 914, a neighbor list for each mobile station in Cell A. The process then returns to the wait state of Step 902. Steps 922, 924, and 925 are performed within each cell of the system. Through the process of FIG. 9, accurate neighbor lists are cyclically created for mobile stations operating within the system.

While the invention has been described as implemented into the IS-136 system, it will be obvious to one skilled in the art that the invention has equal applicability to the IS-54B, the EIA/TIA-553, or similar systems. In IS-54B the invention would operate similarly to that disclosed for an IS-136 system, with the exception that the analog control channel (ACCH) would be used in placed of the DCCH channel. In EIA/TIA-553, the measurements would be made only at the base station of the pertinent cell, since analog mobiles are not capable of performing MAHO.

It would also be obvious to one skilled in the art that other methods may be used to perform the downlink measurements at the mobile station. For example, the mobile assisted channel allocation (MACA) of IS-136 may be used to measure DCCH channel strength in an IS-136 system. MACA is an IS-136 option in which the system instructs idle mobile stations to make signal strength measurements when idle and report the measurements to the system upon a call or registration access.

The above described embodiments of the invention are also suited for implementation into systems that include cells such as cells Cell A–Cell S of FIG. 1–3, that are divided into a number of smaller microcells. For example, if a number of microcells share the coverage area of Cell A, handoffs between Cell A and these microcells would be frequent. Also, if other neighboring cells contained microcells, handoffs between Cell A and these neighboring microcells may also be frequent. It would be useful in this example to define some of these microcells as neighbor cells to Cell A. By including the DCCHs of these microcells among the DCCHs to be measured in the invention, any microcells belonging in the neighbor cell list will be included.

As can be seen from the above description, the method and system of the invention allows creation of a neighbor cell list which takes into account variations in the size and shape of the coverage area of cells within a cellular system. The invention also allows the neighbor cell list to be verified periodically to account for long term effects on the size and shape of the coverage area.

It is believed that the operation and constructions of the present invention will be apparent from the foregoing description and, while the invention shown and described herein has been characterized as particular embodiments, changes and modifications may be made therein without departing from the spirit and scope of the invention as defined in the following claims.

What is claimed is:

1. In a mobile telecommunications system comprising a plurality of mobile stations and a fixed network comprising a first base station and a first plurality of neighboring base stations, each of said first base station and first plurality of neighboring base stations having a coverage area, a method for creating a neighbor cell list for use in determining a handoff target base station in handoff of communications with a selected mobile station from the first base station to a neighboring base station, said method comprising the steps of:

collecting data at a call control unit, the data associated with the first base station and each of the first plurality of neighboring base stations;

providing the data collected during said step of is collecting to a quality matrix generator;

determining, responsive to the data provided during said step of providing the data, at the quality matrix generator, a plurality of parameters, each of said parameters associated with the first base station and one of the plurality of neighboring base stations;

providing the plurality of parameters, determined during said step of determining, to a neighbor cell list generator; and generating, responsive to said parameters provided to the neighbor cell list, a neighbor cell list, said neighbor cell list including a channel identifier of a channel of each of a second plurality of neighboring base stations of the first plurality of neighboring base stations.

2. The method of claim 1, wherein said step of collecting data comprises collecting data on a plurality of events, each event being associated with the first base station and one of the first plurality of neighboring base stations.

3. The method of claim 2, wherein said step of collecting data comprises collecting data on a plurality of mobile station presence verifications, each mobile station presence verification performed upon a handoff attempt from the first base station to one of the first plurality of neighboring base stations.

4. The method of claim 2, wherein said step of collecting data comprises collecting data on a plurality of handoff attempts from the first base station to one of the first plurality of neighboring base stations.

5. The method of claim 2, wherein said step of collecting data comprises collecting statistics on a plurality of lost calls, each lost call having been handed off from said first base station to one of the plurality of neighboring base stations.

6. The method of claim 2, wherein said step of collecting data further comprises measuring at at least one mobile station of a plurality of mobile stations located within the coverage area of the first base station, signal levels on a plurality of measurement channels, each channel carrying transmissions from one of the first plurality of neighboring base stations.

7. The method of claim 6, wherein the signal level measurements of said step of collecting data are performed by selectively inserting at least one of said plurality of measurement channels into at least one neighbor cell list transmitted to said at least one mobile station.

8. The method of claim 6, wherein said step of collecting data further comprises storing an indication of the location, within the coverage area of the first base station, of said at least one mobile station during each measurement of signal levels on said plurality of measurement channels.

9. The method of claim 8, wherein each of said plurality of parameters comprises at least two subvalues, both subvalues associated with the first base station and one of the base stations of the first plurality of neighboring base stations, each of said at least two subvalues associated with a separate area of the coverage area of the first base station.

10. The method of claim 2, wherein said step of collecting data comprises measuring, at the first base station, signal levels on a plurality of communications channels, each carrying transmissions from a neighboring base station.

11. The method of claim 2, wherein the selected mobile station is associated with at least one mobile station characteristic and said neighbor cell list generated in said step of generating is further generated as a function of said at least one mobile station characteristic.

12. The method of claim 11, wherein said at least one mobile station characteristic comprises a value indicative of the speed distribution of the selected mobile station.

13. The method of claim 11, wherein said at least one mobile station characteristic comprises a plurality of parameters, each parameter indicative of the frequency of usage of one of the first plurality of neighboring base stations by the selected mobile station.

14. The method of claim 2, wherein the selected mobile station is associated with at least one subscriber characteristic, said subscriber characteristic being a characteristic of the subscriber using the selected mobile station.

15. In a mobile telecommunications system comprising a plurality of mobile stations and, a fixed network comprising a first plurality of base stations, each of said first plurality of base stations having a coverage area, a method for creating a neighbor cell list for use in determining a handoff target base station in handoff of communications, between said system and a selected mobile station, from a first base station to a second base station, said method comprising the steps of:

collecting data at a call control unit, the data associated with each of a first plurality of base station pairs, each of said first plurality of base station pairs comprising a combination of two base stations of said system;

providing the data collected during said step of collecting to a quality matrix generator;

determining, responsive to the data provided to the quality matrix generator, a first plurality of parameters, each of said parameters associated with one of said first plurality of base station pairs;

providing the first plurality of parameters determined during said step of determining the first plurality of parameters to a neighbor cell list generator;

measuring, at the selected mobile station, a plurality of signal levels on a plurality of measurement channels, each measurement channel carrying transmissions from a base station of one of said first plurality of base stations;

determining, responsive to results of signal level measurements performed in said step of measuring, a second plurality of parameters, each associated with the selected mobile station and one of the base stations of said first plurality of base stations, wherein each of said second plurality of parameters is a function of said first plurality of parameters and said plurality of signal levels measured in said step of measuring;

providing the second plurality of parameters determined during said step of determining the second plurality of parameters to the neighbor cell list generator; and generating, responsive to said second plurality of parameters, a neighbor cell list at the neighbor cell list generator, said neighbor cell list including a channel identifier of a channel of each of a second plurality of base stations of said first plurality of base stations.

16. The method of claim 15, wherein said step of collecting data comprises collecting data on a plurality of events, each event being associted with one of a first plurality of base station pairs.

17. The method of claim 16, wherein said step of collecting data comprises collecting data on a plurality of mobile station presence verifications, each mobile station presence verification performed upon a handoff attempt between base stations of one of a first plurality of base station pairs.

18. The method of claim 16, wherein said step of collecting data comprises collecting data on a plurality of handoff attempts between base stations of one of a first plurality of base station pairs.

19. The method of claim 15, wherein said step of measuring is performed by selectively inserting at least one of said plurality of measurement channels into at least one neighbor cell list transmitted to said at least one mobile station.

20. The method of claim 15, wherein the selected mobile station is associated with at least one mobile station characteristic and said neighbor cell list generator in said step of generating is further generated as a function of said at least one mobile station characteristic.

21. In a mobile telecommunications system comprising a plurality of mobile stations in a fixed network comprising a first base station and a first plurality of neighboring base stations, each of said first base station and first plurality of neighboring base stations having a coverage area and an apparatus for creating a neighbor cell list for use in determining a handoff target base station in handoff of communications with a selected mobile station from the first base station to a neighboring base station, said apparatus comprising:

a call control unit for collecting data associated with the first base station and each of the first plurality of neighboring base stations;

a quality matrix generator, coupled to said call control unit, said quality matrix generator for receiving data collected in said call control unit and generating a plurality of parameters, wherein each of said parameters is associated with the first base station and one of the plurality of neighboring base stations; and a neighbor list generator, coupled to said quality matrix generator, said neighbor list generator for receiving said parameters generated by said quality matrix generator and generating a neighbor cell list wherein said neighbor cell list includes information on each of a second plurality of neighboring base stations of the first plurality of neighboring base stations.

22. The apparatus of claim 21, wherein said data collected by said call control unit comprises data on a plurality of events, each event being associated with the first base station and one of the first plurality of neighboring base stations.

23. The apparatus of claim 22, wherein said plurality of events comprises a plurality of mobile station presence verifications, each mobile station presence verification performed upon a handoff attempt from the first base station to one of the first plurality of neighboring base stations.

24. The apparatus of claim 22, wherein said plurality of events comprises a plurality of handoff attempts from the first base station to one of the first plurality of neighboring base stations.

25. The apparatus of claim 22, wherein said plurality of events comprises a plurality of lost call events, each lost call having been handed off from said first base station to one of the plurality of neighboring base stations.

26. The apparatus of claim 22 further comprising a candidate neighbor list generator for receiving signal level measurements made at at least one mobile station of a plurality of mobile stations located within the coverage area of the first base station, wherein said signal level measurements are made on a plurality of measurement channels, each measurement channel carrying transmissions from one of the first plurality of neighboring base stations.

27. The apparatus of claim 26, wherein said candidate neighbor list generator, further, selectively inserts at least one of said plurality of measurement channels into at least one neighbor cell list transmitted to said at least one mobile station.

28. The apparatus of claim 26, wherein said call control unit further stores an indication of the location of said at least one mobile station within the coverage area of the first base station during measurement of signal levels on each of said measurement channels.

29. The apparatus of claim 27, wherein each of said plurality of parameters comprises at least two subvalues, both subvalues associated with the first base station and one of the base stations of the first plurality of neighboring base stations, each of said at least two subvalues associated with a separate area of the coverage area of the first base station.

30. The apparatus of claim 21, wherein said quality matrix generator further comprises means for storing signal level measurements made at the first base station on a plurality of communications channels each carrying transmissions from a neighboring base station and further, wherein said quality matrix generator generates said plurality of parameters as a function of said signal level measurements.

31. The apparatus of claim 21, wherein the selected mobile station is associated with at least one mobile station characteristic and said neighbor cell list generated by said neighbor list generator is generated as a function of said at least one mobile station characteristic.

32. The apparatus of claim 31, wherein said at least one mobile station characteristic comprises a value indicative of the speed distribution of the selected mobile station.

33. The apparatus of claim 31, wherein said at least one mobile station characteristic comprises a plurality of parameters, each parameter indicative of the frequency of usage of one of the first plurality of neighboring base stations by the selected mobile station.

34. In a mobile telecommunications system comprising a plurality of mobile stations and, a fixed network comprising a first plurality of base stations, each of said first plurality of base stations having a coverage area, an apparatus for creating a neighbor cell list for use in determining a handoff target base station in handoff of communications, between said system and a selected mobile station, from a first base station to a second base station, said apparatus comprising:

- a call control unit for collecting data associated with each of a first plurality of base station pairs, each of said first plurality of base station pairs comprising a combination of two base stations of said first plurality of base stations;
- a quality matrix generator, coupled to said call control unit, said quality matrix generator for receiving data collected in said call control unit and determining, responsive to the data collected in said step of collecting, a first plurality of parameters, each of said first parameters associated with one of said first plurality of base station pairs; and
- a neighbor list generator, coupled to said matrix generator, said neighbor list generator for receiving signal level measurements, made at the selected mobile station, on a plurality of measurement channels, each measurement channel carrying transmissions from a base station of said system, said neighbor list generator for determining, from said signal level measurements, a second plurality of parameters, each associated with the selected mobile station and one of the base stations of said first plurality of base stations, wherein each of said second plurality of parameters is a function of said first plurality of parameters and said plurality of signal level measurements, said neighbor list further generating, responsive to said second plurality of parameters, a neighbor cell list, said neighbor cell list including channel identifiers of each of a second plurality of base stations of said first plurality of base stations.

35. The apparatus of claim 34, wherein said data collected in said call control unit comprises data on a plurality of events, each event being associated with one of a first plurality of base station pairs, each comprising a combination of two base stations of said first plurality of base stations.

36. The apparatus of claim 35, wherein said plurality of events comprises a plurality of mobile station presence verifications, each mobile station presence verification performed upon a handoff attempt between base stations of one of said first plurality of base station pairs.

37. The apparatus of claim 35, wherein said plurality of events comprises a plurality of handoff attempts between base stations of one of said first plurality of base station pairs.

38. The apparatus of claim 34, wherein the selected mobile station is associated with at least one mobile station characteristic and said neighbor cell list, generated in said neighbor list generator, is generated as a function of said at least one mobile station characteristic.

39. In a mobile station-handoff method for handing off communications in a mobile telecommunications system formed of radio communication stations including at least a selected mobile station, a first base station, and a first plurality of neighboring base stations neighboring the first base station, each of said first base stations defining a coverage area, an improvement of a method for creating a neighbor cell list associated with the selected mobile station, the neighbor cell list for use in determining a handoff target base station in handoff of communications with the selected mobile station from the first base station to a neighboring base station, the handoff target base station selected out of the first plurality of neighboring base stations, said method comprising the steps of:

- collecting data at a call control unit, the data associated with at least one of the radio communication stations of the mobile telecommunications system;
- providing the data collected during said step of collecting to a quality matrix generator;
- determining, responsive to the data provided during said step of providing the data to the quality matrix data, a plurality of parameters, including at least one parameter associated with the at least one of the radio communication stations;
- providing the plurality of parameters, determined during said step of determining, to a neighbor cell list generator; and
- generating, responsive to said parameters provided to the neighbor cell list generator, a neighbor cell list for the at least one radio communication station.

40. The method of claim 39 wherein the data collected during said step of collecting comprises data associated with the selected mobile station.

41. The method of claim 40 wherein the data associated with the selected mobile station comprises data associated with characteristics of the selected mobile station.

42. The method of claim 41 wherein said characteristics of the selected mobile station forming the data associated with the selected mobile station comprise inherent characteristics inherent to the selected mobile station.

43. The method of claim 41 wherein said characteristics of the selected mobile station forming the data associated with the selected mobile station comprise characteristics representative of behavior of the selected mobile stations.

44. The method of claim 41 wherein said characteristics of the selected mobile station forming the data associated with the selected mobile station comprise subscription-related characteristics of the selected mobile station.

45. The method of claim 40 wherein the data associated with the selected mobile station comprises data measured at the selected mobile station.

46. The method of claim 39 wherein the data collected during said step of collecting comprises data associated with the first base station.

47. The method of claim 39 wherein the data collected during said step of collecting comprises data associated with the first plurality of neighboring base stations.

48. The method of claim 39 wherein the neighbor cell list generated during said step of generating comprises a channel identifier of a channel of each of a second plurality of neighboring base stations of the first plurality of neighboring base stations.

* * * * *